United States Patent
Teratani et al.

(10) Patent No.: US 7,203,357 B2
(45) Date of Patent: Apr. 10, 2007

(54) IMAGE DATA PROCESSOR AND IMAGE DATA PROCESSING METHOD

(75) Inventors: Masato Teratani, Yoro-Gun (JP); Tomomichi Nakai, Hashima-Gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 713 days.

(21) Appl. No.: 10/656,923

(22) Filed: Sep. 4, 2003

(65) Prior Publication Data
US 2004/0091167 A1   May 13, 2004

(30) Foreign Application Priority Data
Sep. 5, 2002   (JP) ............................. 2002-259648

(51) Int. Cl.
G06K 9/00 (2006.01)
(52) U.S. Cl. ..................... 382/168; 382/169
(58) Field of Classification Search ................ 382/168, 382/169, 260, 267, 289, 254, 131; 235/462.1, 235/462.25, 472.01; 348/65, 45; 600/117
See application file for complete search history.

(56) References Cited

U.S. PATENT DOCUMENTS 5,305,204 A * 4/1994 Ohhashi ..................... 382/131
5,751,341 A * 5/1998 Chaleki et al. ................ 348/65
6,587,593 B1 * 7/2003 Matsuoka et al. .......... 382/260
7,077,319 B2 * 7/2006 Schnee et al. ........... 235/462.1

FOREIGN PATENT DOCUMENTS

JP   405293095   * 11/1993
JP   10-134178   5/1998

* cited by examiner

Primary Examiner—Anh Hong Do
(74) Attorney, Agent, or Firm—Hogan & Hartson LLP (57) ABSTRACT

Image data of a target pixel and peripheral pixels are stored in a memory. Using a most significant bit extractor circuit, 4 most significant bits of data are extracted from each image data. A histogram circuit generates a histogram of the extracted 4-bit data. Referring to the histogram, a data processor circuit (17) replaces the image data of the target pixel with a maximum value of the numbers of pixels having the same level and outputs the processed data. Then, a digit-complementing circuit converts the data output from the data processor circuit to 8-bit data and outputs the converted data. In this manner, a regular image is converted into an image similar to a draft-design image.

10 Claims, 7 Drawing Sheets

IMAGE DATA PROCESSOR AND IMAGE DATA PROCESSING METHOD

BACKGROUND OF THE INVENTION

1. Field of the Invention

The present invention relates to an image data processor and an image data processing method for applying a conversion process to an ordinary image to obtain an image to which a special effect processing is applied.

2. Description of the Related Art

Figure 8:
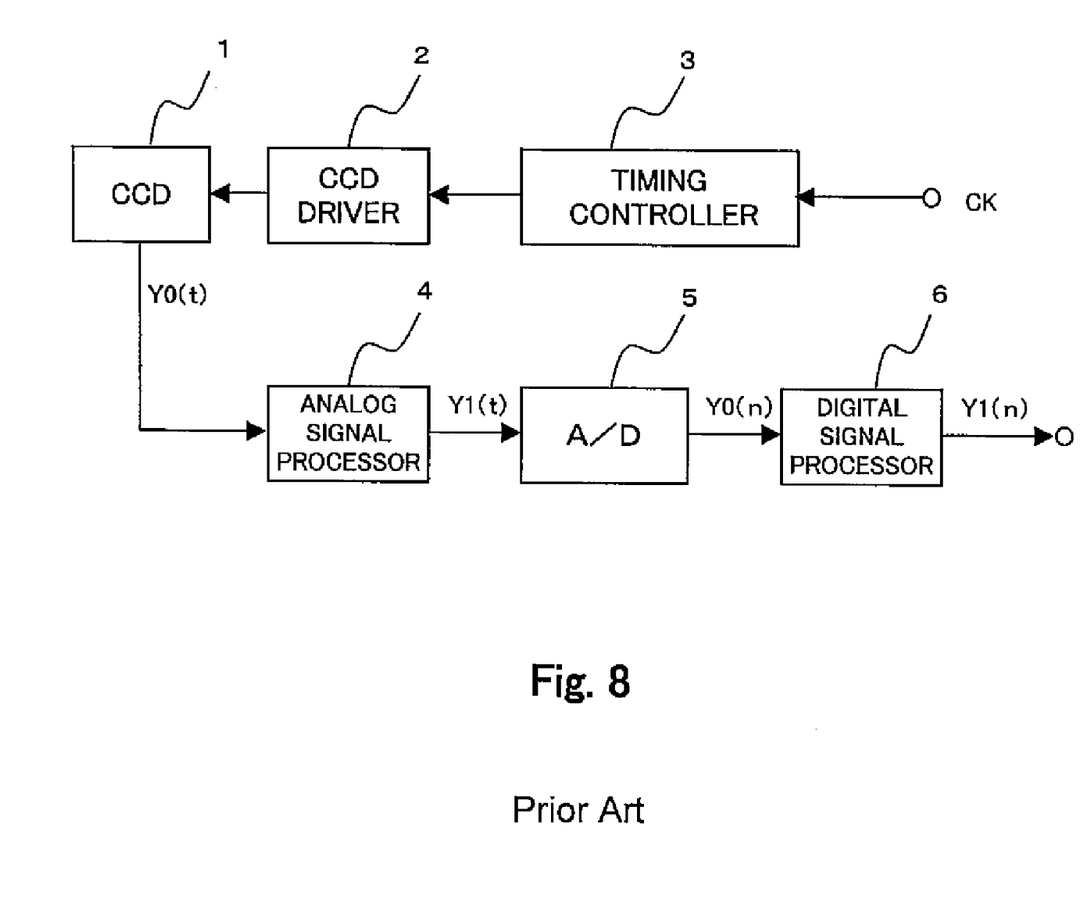
FIG. 8 is a block diagram schematically showing a structure of a conventional image capturing device.

FIG. 8 is a block diagram schematically showing a structure of a conventional image capturing device. The image capturing device shown in FIG. 8 comprises a CCD image sensor (solid-state image capturing element) 1, a CCD driver circuit 2, a timing controller circuit 3, an analog signal processor circuit 4, an A/D converter circuit 5, and a digital signal processor circuit 6.

The solid-state image capturing element 1 has a light receiving region which includes a plurality of light receiving pixels arranged in a matrix, receives, in each light receiving pixel, light incident on the light receiving region, and generates information charges through photoelectric conversion. The solid-state image capturing element 1 accumulates, in each light receiving pixel, the information charges during a predetermined accumulation period and then sequentially transfers the accumulated charges through a plurality of shift registers. The transferred charges are converted into voltage values by an output unit provided on the final stage of the transfer route and is output as an image signal $Y0(t)$.

The CCD driver circuit 2 generates a plurality of clock pulses synchronized with a vertical synchronization signal VT and a horizontal synchronization signal HT supplied from the timing controller circuit 3 as will be described below. The CCD driver circuit 2 supplies the generated clock pulses to the solid-state image capturing element 1 and drives the solid-state image capturing element 1 to sequentially transfer the information charges accumulated in the plurality of light receiving pixels.

The timing controller circuit 3 counts a reference clock CK and generates a vertical synchronization signal VT and a horizontal synchronization signal HT and determines the vertical scanning period and the horizontal scanning period for the solid-state image capturing element 1. For example, when the device functions according to the NTSC standards, the timing controller circuit 3 divides a reference clock CK having a frequency which is 4 times the frequency 3.58 MHz of a color subcarrier wave used in signal processing steps into 1/910 to generate a horizontal synchronization signal HT. Similarly, the timing controller 3 divides the horizontal synchronization signal HT into 2/525 to generate a vertical synchronization signal VT.

The analog signal processor circuit 4 applies an analog signal process such as a CDS (Correlated Double Sampling) and AGC (Automatic Gain Control) to the image signal $Y0(t)$ output from the solid-state image capturing element 1 to generate an image signal $Y1(t)$. The A/D converter circuit 5 digitizes the image signal $Y1(t)$ in synchronization with the operation timing of the solid-state image capturing element 1 to convert the signal to a digital signal and outputs the digital signal as image data $Y0(n)$.

The digital signal processor circuit 6 applies a digital signal process such as color separation and matrix calculation to the image data $Y0(n)$ output from the A/D converter circuit 5 and generates image data $Y1(n)$ which includes brightness data and color-difference data.

The image data $Y1(n)$ output from the digital signal processor circuit 6 is stored in a storage medium such as a semiconductor memory and a magnetic disk, and, at the same time, is supplied to a driver device for driving a display device such as an LCD panel.

In an image capturing device as described, additional processes are applied such as, for example, a process to obtain a binary image by comparing the data of each pixel in the image data to a threshold value and a process to apply differentiation in the vertical or horizontal direction of the pixel data, and to display an image according to the differentiated values to thereby display an image while emphasizing the outline of the image. In addition, various signaling processes for obtaining various replayed images have been proposed.

SUMMARY OF THE INVENTION

According to one aspect of the present invention, a histogram of the brightness distribution of pixel data corresponding to a target pixel to be processed and a plurality of peripheral pixels adjacent to the target pixel is created and the pixel data of the target pixel is replaced with a value determined based on the maximum value in the histogram. With this structure, it is possible to convert an ordinary image into an image in a form similar to a rough image or a draft-design image.

DESCRIPTION OF PREFERRED EMBODIMENT

An image processor according to the preferred embodiment of the present invention will now be described with reference to the drawings.

Figure 1:
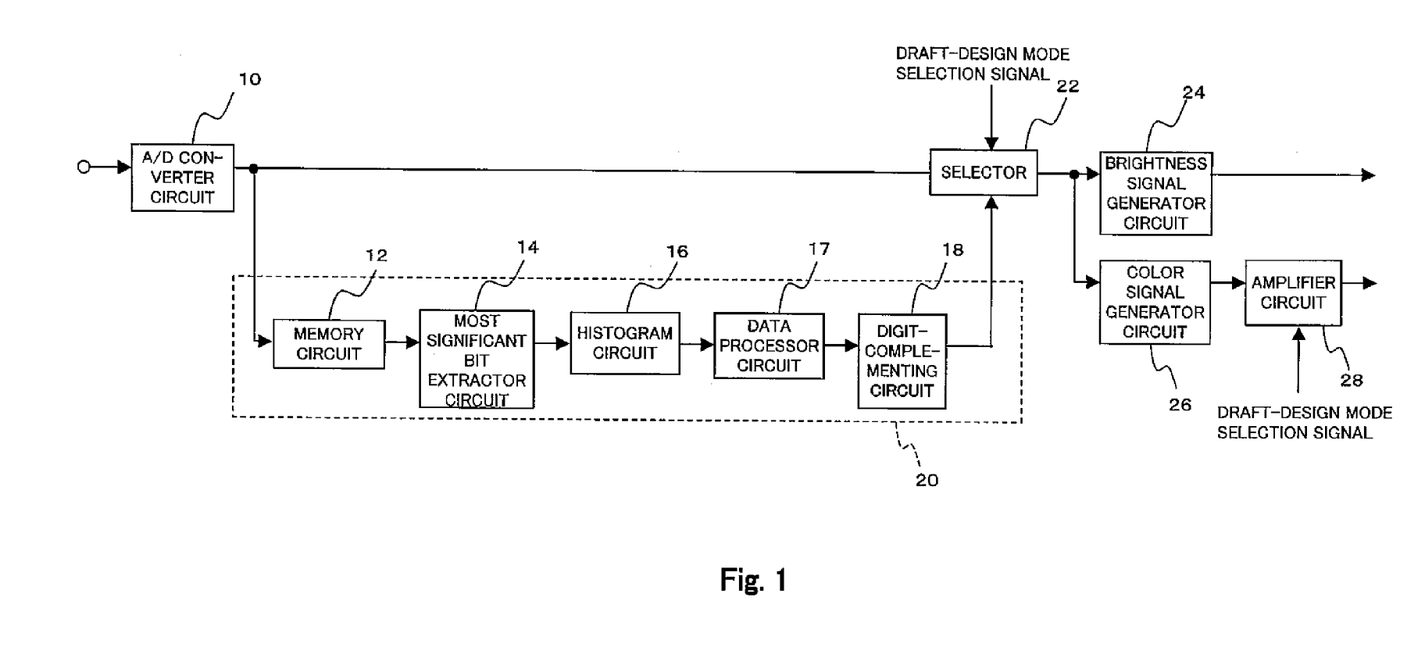
FIG. 1 is a block diagram schematically showing a structure of an image processor according to a preferred embodiment of the present invention.

FIG. 1 is a block diagram schematically showing a structure of an image processor according to a preferred embodiment of the present invention.

The image processor comprises an A/D converter circuit 10 for digitizing image data sent from a CCD image sensor to capture an image of a scene or the like to convert an analog signal to a digital signal, a draft-design processor circuit 20 for converting image data into a display format like a draft-design image, a selector 22 for selectively outputting one of a signal directly input from the A/D converter circuit 10 and a signal input through the draft-design processor circuit 20, a brightness signal generator circuit 24 for generating a brightness signal based on a signal output from the selector 22, and a color signal generator circuit 26 for generating a color signal.

A sequence of processes executed by the image processor will now be described in detail.

Figure 2:
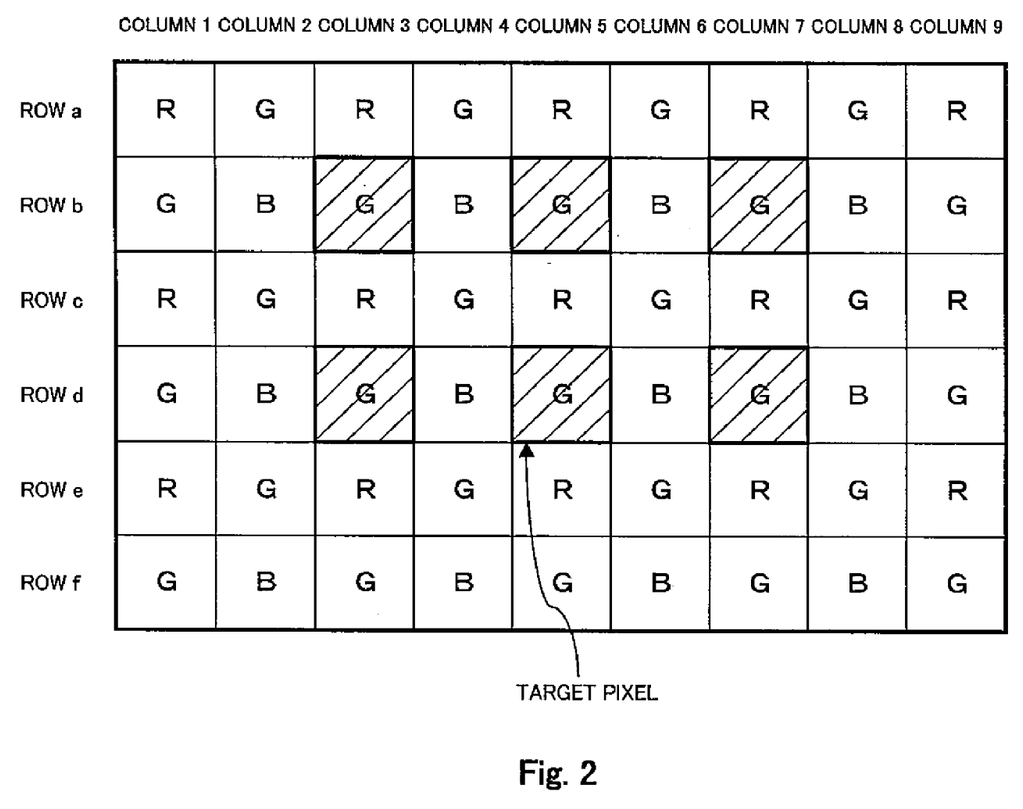
FIG. 2 is an explanatory diagram showing arrangement of pixels in a CCD image sensor.

An image signal output from a CCD image sensor is input to the A/D converter circuit 10. Here, the CCD image sensor in the embodiment is a color image sensor, for example, to which color filters are mounted in a mosaic-arrangement as shown in FIG. 2 and each color component is assigned to light receiving pixels of the CCD image sensor in an orderly manner. In each pixel in this structure, charges corresponding to light of the color of the color filter mounted on the pixel are accumulated. In other words, in each pixel, charges corresponding to the brightness value of the corresponding color are obtained. The CCD image sensor sequentially outputs, for the accumulated charges for pixels in each frame from a horizontal line of the lower side by one line. Thus, the image signal output from the CCD image sensor is an analog signal containing a pixel signal corresponding to the brightness value of each pixel in one frame.

The image signal is sequentially input to the A/D converter circuit 10 in beginning with the signal for pixels of the horizontal line on the lower side. The A/D converter circuit 10 converts the image signal from an analog signal to a digital signal to generate image data and outputs the image data to the selector 22 and to a memory circuit 12.

The image data output from the A/D converter circuit 10 is input to the selector 22 and to the draft-design processor circuit 20. The image data input to the draft-design processor circuit 20 is processed within the draft-design processor circuit 20 and then is input to the selector 22. The selector 22 outputs the image data directly input from the A/D converter circuit 10 to the selector 22 to the brightness signal generator circuit 24 and to the color signal generator circuit 26 during a regular image capturing mode. When, on the other hand, a user wishes to convert an ordinary image into a display format like a draft-design image, a draft-design mode selection signal is input to the selector 22 by the user. In this case, the selector 22 outputs data input through the draft-design processor circuit 20 to the brightness signal generator circuit 24 and to the color signal generator circuit 26.

Figure 3:
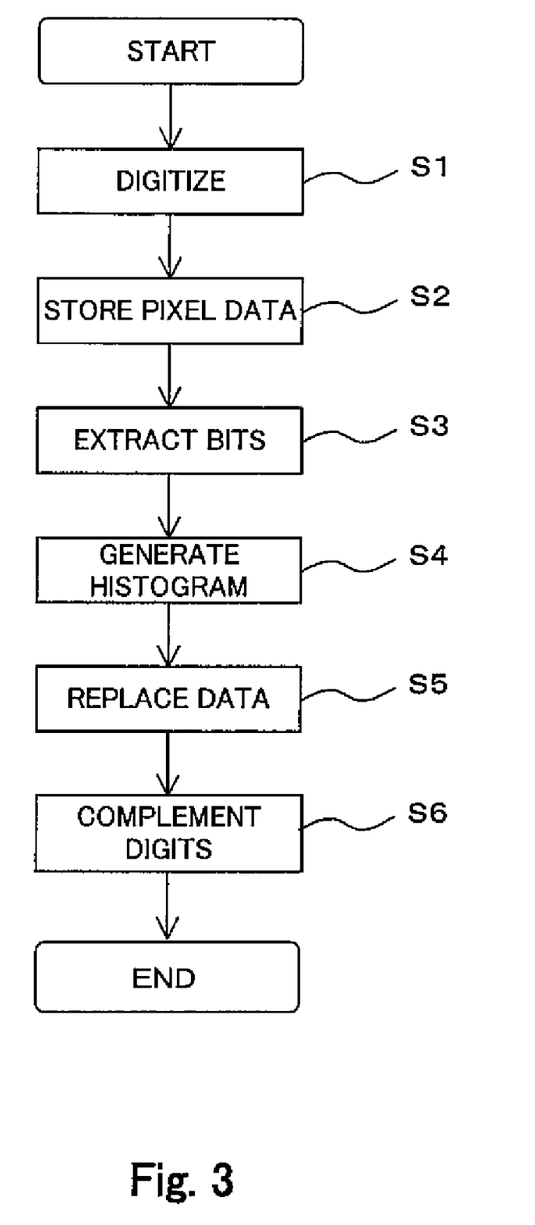
FIG. 3 is a flowchart for explaining a process executed by a draft-design processor circuit.

FIG. 3 is a flowchart for explaining a process of data conversion. A data conversion process executed by the draft-design processor circuit 20 will now be described referring to FIG. 3.

First, in step S1, an analog image signal output from an analog signal processor circuit (not shown) is digitized by the A/D converter circuit 10 to generate first image data which is a digital signal. The first image data contains pixel data of a target pixel and pixel data of a plurality of peripheral pixels adjacent the target pixel.

Then, in step S2, the memory circuit 12 sequentially stores pixel data of the target pixel to be processed and pixel data of a plurality of peripheral pixels which are assigned the same color component as the target pixel each time pixel data is input from the A/D converter circuit 10. For example, when pixel data of (column 3, row b) in FIG. 2 is input, pixel data of six adjacent pixels which are assigned a color filter of green G, (column 3, row b), (column 5, row b), (column 7, row b), (column 3, row d), (column 5, row d), and (column 7, row d) are stored. Among these six pixels, the lower center pixel (column 5, row d) is positioned approximately in the center, and thus, is set as the target pixel. Then, when the pixel data of a pixel (column 2, row b) which follows the pixel (column 3, row b) is input, pixel data of six adjacent pixels to which a color filter of blue B is assigned, (column 2, row b), (column 4, row b), (column 6, row b), (column 2, row d), (column 4, row d), and (column 6, row d) are stored. By repeating these processes, a plurality of peripheral pixels adjacent the target pixel are sequentially stored.

Next, in step S3, a most significant bit extractor circuit 14 reads pixel data stored in the memory circuit 12 and extracts only the data of 4 most significant bits from each pixel data and outputs the 4-bit pixel data to a histogram circuit 16. For example, when the pixel data is "11010010", the 4 most significant bits, "1101" are extracted. In this manner, by extracting the most significant bits of the pixel data to reduce the number of bits, 256-gradation represented by 8 bits is converted to 16-gradation represented by 4 bits. As a result, the amount of data to be processed can be reduced, the processor circuit can be simplified, and the processing speed can be improved. The number of most significant bits of the pixel data extracted in the process of step S3 is not limited to 4 bits, and the number may be a number larger or smaller than 4 bits.

Figure 4:
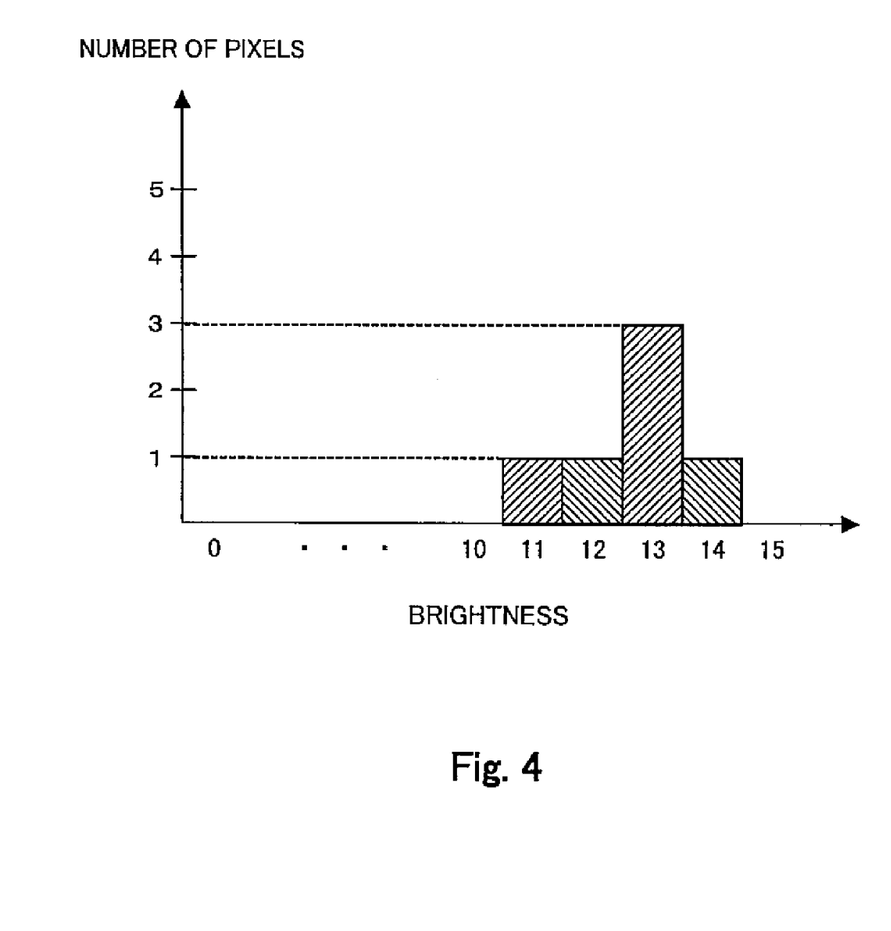
FIG. 4 is an explanatory diagram for explaining a process by a histogram circuit.

Then, in step S4, the histogram circuit 16 generates a histogram of a brightness distribution as shown in FIG. 4 with respect to six input 4-bit data. In FIG. 4, pixel data of six pixels corresponding to the color component of G as shown in FIG. 2 are used, with the pixel of (column 5, row d) as the target pixel P0 and the pixels of (column 3, row b), (column 5, row b), (column 7, row b), (column 3, row d), and (column 7, row d) as peripheral pixels P1–P5.

Next, in step S5, a data processor circuit 17 replaces the pixel data P0($d$) of the target pixel P0 with a maximum value of the histogram (maximum value of the frequency of occurrence). More specifically, numbers of pixels having the same brightness level among the pixel data are counted and a maximum value of the numbers of pixels is output as new pixel data P0'($d$) of the target pixel P0. For example, when the signal levels P0($d$)–P5($d$) of the pixel data of six pixels P0–P5 converted to 16-gradation are "14", "13", "13", "11", "12", and "13" as shown in FIG. 4, the numbers of pixels having the same level are, respectively, one pixel having a level of "11", one pixel having a level of "12", three pixels having a level of "13", and one pixel having a level of "14". Thus, in step S5, the numbers of pixels having the same level are referenced and the maximum value, "3", among the numbers of pixels is output as the pixel data P0'($d$) of the target pixel P0. In this process, because the range of determination includes only 6 pixels, the value to be output is a value from 1 to 6. Therefore, the output data corresponds to 3-bit data of "001" to "110".

Figure 5:
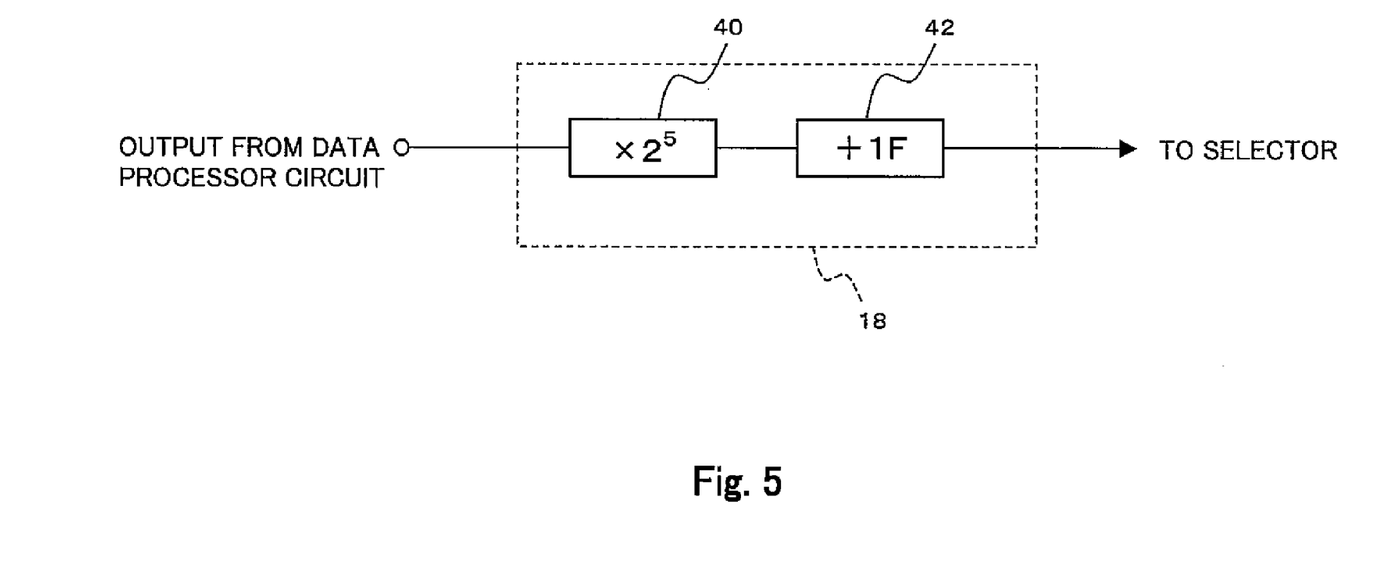
FIG. 5 is a block diagram schematically showing a digit-complementing circuit.

Next, in step S6, a digit-complementing circuit 18 converts the pixel data P0'(d) into data having a number of bits suitable to be output to the brightness signal generator circuit and color signal generator circuit. FIG. 5 is a block diagram showing the digit-complementing circuit 18. In this example, because data of 3 bits is output from the histogram circuit, the data is multiplied by $2^5$ by a digit adder section 40 to add 5 bits of 0 to the side of least significant bits of the 3-bit data so that the data is converted into data of 8 bits suitable to be output to the brightness signal generator circuit 24 or the like.

As described above, the value of the 3-bit data of the pixel data P0'($d$) is represented from "001" to "110". Accordingly, the output of the digit adder section 40 is "00100000" to "11000000". A brightness adjusting section 42 adds "11111" to the 8-bit data output from the digit adder section 40. With this process, the maximum value of the 8-bit data output from the digit-complementing circuit 18 becomes "11011111", which allows for a more effective use of 8 bits and a display with higher brightness, and, consequently, a clearer image display. The process by the draft-design processor circuit 20 is completed with the completion of the process of step S6.

In this process, it is also possible to suitably assign values of "00000000" to "11111111" corresponding to the six values of "001" to "110" (for example, with even spacing) to maximize the usage of gradation of 8 bits or to assign a value of appropriate range with appropriate spaces to allow more easily viewable display.

After a data conversion process at the draft-design processor circuit 20 is completed, pixel data P0'(d) is output from the draft-design processor circuit 20 to the selector 22. The selector 22 selects one of the regular pixel data and the data after the data conversion process. For example, when the user selects a draft-design mode and a draft-design mode selection signal is input to the selector 22, the pixel data P0'(d) converted into a data of 8 bits input from the digit-complementing circuit 18 is output to the brightness signal generator circuit 24 and to the color signal generator circuit 26. User selection of the draft-design mode can be realized as follows. When the image processor is constructed as a portion of a digital camera, for example, it is possible to provide a push button on an external surface of the digital camera and to configure the digital camera such that, when the user presses the push button, a draft-design mode is selected and a draft-design mode selection signal is input to the selector 22.

The brightness signal generator circuit 24 applies a process identical to that applied to the regular image data to the input pixel data P0'(d) to generate brightness data and outputs the generated data to a display device (not shown). In the meantime, the color signal generator circuit 26 generates color data, but because the gain value of an amplifier circuit 28 provided following the color signal generator circuit 26 is set to 0, the value of the generated color data is also set to 0. The amplifier circuit 28 sets the gain to 0 only when a draft-design mode selection signal is input.

Figure 6:
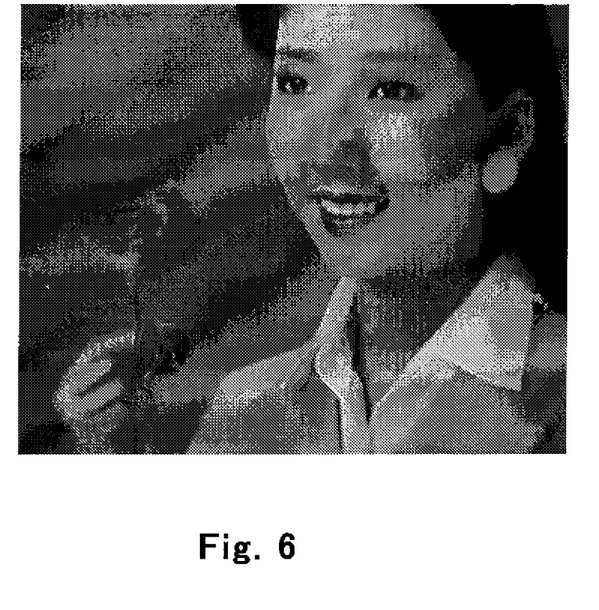
FIG. 6 is an example image showing an image before a process in a draft-design mode.
Figure 7:
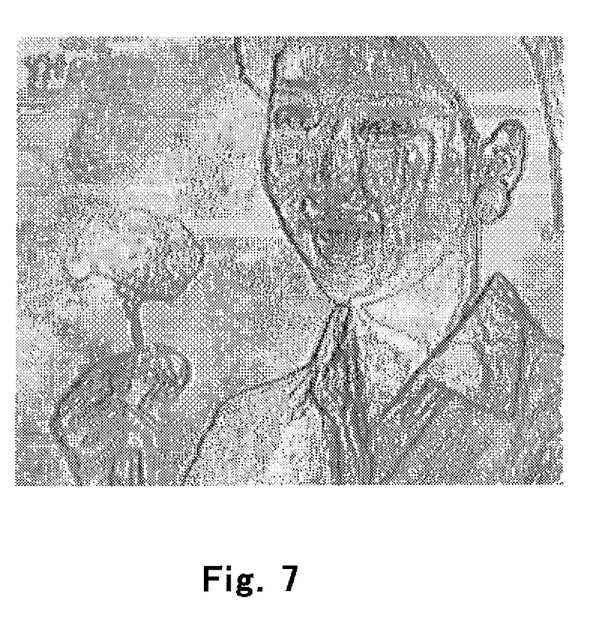
FIG. 7 is an example image showing an image after a process in a draft-design mode.

The process described above is the process executed by an image processor according to the present invention. Example images are shown in FIGS. 6 and 7. FIG. 6 shows an image which was not processed by the draft-design processor circuit 20, while FIG. 7 shows an image which underwent processing applied by the draft-design processor circuit 20. As shown in FIG. 7, by applying a data conversion process by the draft-design processor circuit 20, the brightness value in regions of similar lightness becomes high and white is output. On the other hand, the brightness value in regions where the lightness changes becomes low and black is output. Because of this, it is possible to obtain, from a regular captured image, an image similar to a draft-design image in which the regions where the lightness changes are emphasized.

In the embodiment described above, a draft-design process is applied to image data captured by a CCD image sensor. In another preferred embodiment of the present invention, it is also possible to apply the draft-deign process to image data stored in a memory or the like. In addition, when the draft-design process is to be executed using a personal computer or the like, it is possible to make a program for the sequence of the draft-design process. In addition, in the above-described preferred embodiment, the draft-design process is applied to a color image, but the process may alternatively be applied to a monochrome image.

What is claimed is:

1. An image data processor for converting first image data into second image data, comprising:
   a memory for storing pixel data corresponding to a target pixel to be processed within the first image data and pixel data corresponding to a plurality of peripheral pixels adjacent to the target pixel within the first image data;
   a histogram circuit for generating a histogram of a brightness distribution of the pixel data stored in the memory; and
   a data processor circuit for replacing the pixel data of the target pixel with a value determined based on a maximum value of the histogram and for outputting the processed data; wherein
   the output of the data processor circuit is the second image data.

2. The image data processor according to claim 1, wherein the second image data is image data for displaying a replay image in which a special effect processing is applied to the first image data.

3. The image data processor according to claim 1, further comprising:
   an extractor circuit for extracting predetermined bits of the pixel data stored in the memory circuit, wherein
   the histogram circuit reads the predetermined bits of the pixel data extracted by the extractor circuit and generates the histogram.

4. The image data processor according to claim 3, further comprising:
   a digit-complementing circuit for multiplying the output of the data processor circuit by a predetermined multiplier to complement the bits of the output of the data processor circuit so that the number of bits of the output becomes identical to the number of bits of the pixel data.

5. The image data processor according to claim 1, further comprising:
   a color data generator circuit for reading the second image data and generating color data; and
   a color gain circuit for providing a predetermined gain to the color data, wherein
   the color gain circuit sets the gain for color data of the target pixel to zero.

6. The method for processing image data to convert first image data to second image data, the method comprising the steps of:
   storing, in a memory, pixel data corresponding to a target pixel to be processed in the first image data and pixel data corresponding to a plurality of peripheral pixels adjacent the target pixel in the first image data;
   generating a histogram of a brightness distribution of the pixel data stored in the memory; and
   replacing the pixel data of the target pixel with a value determined based on a maximum value of the histogram and outputting the second image data.

7. The method for processing image data according to claim 6, wherein
   the second image data is image data for displaying a replay image in which a special effect processing is applied to the first image data.

8. The method for processing image data according to claim 6, further comprising the steps of:
   extracting predetermined bits of the pixel data stored in the memory; and reading the predetermined extracted bits of the pixel data and generating the histogram.

9. The method for processing image data according to claim 8, further comprising:
a digit-complementing step for multiplying the replaced pixel data of the target pixel by a predetermined multiplier to complement the bits so that the number of bits becomes identical to the number of bits of the pixel data.

10. The method for processing image data according to claim 6, further comprising the step of:
generating brightness data and color data based on the second image data, wherein
a gain for the color data of the target pixel is set to zero when the color data is generated.

* * * * *